United States Patent
Miyazaki et al.

(10) Patent No.: US 8,029,884 B2
(45) Date of Patent: Oct. 4, 2011

(54) ANTISTATIC WHITE POLYESTER FILM

(75) Inventors: Taichi Miyazaki, Gifu (JP); Tatsuo Yoshida, Gifu (JP); Takashi Ueda, Mishima (JP); Terufumi Takayama, Gifu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 12/155,365

(22) Filed: Jun. 3, 2008

(65) Prior Publication Data

US 2008/0311385 A1 Dec. 18, 2008

(30) Foreign Application Priority Data

Jun. 4, 2007 (JP) ................................. 2007-147732

(51) Int. Cl.
*B32B 7/02* (2006.01)
*B32B 27/18* (2006.01)
*B32B 27/20* (2006.01)
*B32B 27/30* (2006.01)
*B32B 27/36* (2006.01)

(52) U.S. Cl. ........ 428/212; 428/323; 428/328; 428/339; 428/480; 428/483; 428/522; 359/515; 359/601; 359/615

(58) Field of Classification Search .................. None
See application file for complete search history.

(56) References Cited

U.S. PATENT DOCUMENTS

| | | | | |
|---|---|---|---|---|
| 4,919,757 A | * | 4/1990 | Ohmae et al. | 162/164.3 |
| 5,078,915 A | * | 1/1992 | Sato et al. | 252/519.2 |
| 5,082,730 A | * | 1/1992 | Takeda et al. | 428/336 |
| 5,968,871 A | * | 10/1999 | Katashima et al. | 503/227 |
| 6,042,945 A | * | 3/2000 | Maekawa | 428/411.1 |
| 6,066,442 A | * | 5/2000 | Kurachi et al. | 430/530 |
| 6,130,278 A | * | 10/2000 | Hibiya et al. | 524/322 |
| 6,436,219 B1 | * | 8/2002 | Francis et al. | 156/244.11 |
| 6,521,351 B2 | * | 2/2003 | Murschall et al. | 428/480 |
| 6,689,454 B2 | * | 2/2004 | Murschall et al. | 428/328 |
| 6,787,202 B2 | * | 9/2004 | Mizutani et al. | 428/1.54 |
| 6,841,222 B2 | * | 1/2005 | Murschall et al. | 428/141 |
| 6,875,499 B1 | * | 4/2005 | De Toffol et al. | 428/212 |
| 6,884,517 B2 | * | 4/2005 | Peiffer et al. | 428/480 |
| 6,939,600 B2 | * | 9/2005 | Murschall et al. | 428/212 |
| 7,090,915 B2 | * | 8/2006 | Murschall et al. | 428/220 |
| 7,182,997 B2 | * | 2/2007 | Murschall et al. | 428/220 |
| 7,238,419 B2 | * | 7/2007 | Kern et al. | 428/328 |
| 7,378,039 B2 | * | 5/2008 | Louwet et al. | 252/500 |
| 2009/0042016 A1 | * | 2/2009 | Yoshida et al. | 428/317.9 |
| 2010/0086736 A1 | * | 4/2010 | Ueda et al. | 428/141 |
| 2010/0285302 A1 | * | 11/2010 | Yoshida et al. | 428/317.9 |

FOREIGN PATENT DOCUMENTS

| | | | |
|---|---|---|---|
| JP | 63-62104 A | | 3/1988 |
| JP | 8-48793 A | | 2/1996 |
| JP | 2001-171062 | * | 6/2001 |
| JP | 2001-341443 A | | 12/2001 |
| JP | 2004-149653 A | | 5/2004 |
| JP | 2005-125700 | * | 5/2005 |
| JP | 2005-125700 A | | 5/2005 |

* cited by examiner

*Primary Examiner* — Vivian Chen
(74) *Attorney, Agent, or Firm* — Birch, Stewart, Kolasch & Birch, LLP

(57) ABSTRACT

Provided is an antistatic white polyester film for a surface illuminant reflector, which has practically adequate reflective performance in a visible light region, can form a film with stability even if inorganic fine particles are added in a high concentration, prevents dirt and dust from adhering to the surface of the film due to having an antistatic coat, can control the gloss levels of the front and back sides of the film, and thereby can control a diffusing property of light, and can be suitably used as a base material for a reflector used for a liquid crystal display or an internally illuminated electric ornament signboard. An antistatic white polyester film for a surface illuminant reflector, having a base material layer formed by using a polyester resin and an antistatic applied layer having the surface resistivity of $3 \times 10^{12} \, \Omega/\square$ or less at a temperature of 23° C. and at a relative humidity of 50%, wherein an average reflectivity at a wavelength of 400 to 700 nm is 90% or more on one surface of the polyester film and a difference in a gloss level (60°) between one surface and the other surface of the polyester film is 5 to 80.

8 Claims, No Drawings

ANTISTATIC WHITE POLYESTER FILM

TECHNICAL FIELD

The present invention relates to an antistatic white polyester film for a surface illuminant reflector. More specifically, the present invention relates to an antistatic white polyester film which has practically adequate reflective performance in a visible light region, prevents dirt and dust from adhering to the surface of the film due to having an antistatic coat, can control the gloss levels of the front and back sides of the film and thereby can control a diffusing property of light, and can be suitably used as a base material for a reflector used for a liquid crystal display or an internally illuminated electric ornament signboard.

BACKGROUND ART

In a liquid crystal display, a side light system shown in Patent Document 1 is widely known since it has advantages that it is low-profile and can illuminate uniformly. This side light system refers to a system in which the light of a cold cathode tube is illuminated from an edge of a transparent plate such as an acrylic plate having a certain thickness, and illuminated light is uniformly distributed by virtue of dot print provided for the transparent plate and a screen with uniform brightness can be attained. In this case, it is necessary to install a reflector on the rear side of the screen in order to prevent the illuminated light from escaping toward the rear side of the screen. High reflectiveness and high diffusing property of light are required of this reflecting plate.

As a method for obtaining a polyester film suitable for a reflector of a liquid crystal display in line with this object, a method for allowing the polyester film to contain inorganic fine particles of barium sulfate or the like is known. This method can be performed at relatively low cost. This method is described in, for example, Patent Document 2. However, in this method, since some distinction is made in temperatures of stretching in a longitudinal direction between both surfaces of the film in order to adjust a diffusing property of light, i.e., a gloss level, stretching irregularities are apt to occur and the stability of film forming is low.

Further, when inorganic fine particles of titanium dioxide or the like are added to the polyester film in a high concentration, an improvement in the reflection efficiency can be expected, but since the concentration of inert particles is very high, for example, in the case of adding the inert particles to the polyester film in an amount of 50% by weight, a break of the film often takes place and film forming is very difficult.

Furthermore, the polyester film has a static-prone defect, and when it is charged, dirt and dust adhere to its surface to cause troubles of quality. This has also become a very big problem with a polyester film for the reflector. Accordingly, it is necessary to impart an antistatic property to the polyester film for the reflector. There is a description about the technique of imparting the antistatic property in, for example, Patent Document 3.

[Patent Document 1] Japanese Unexamined Patent Publication No. 63-62104
[Patent Document 2] Japanese Unexamined Patent Publication No. 2005-125700
[Patent Document 3] Japanese Unexamined Patent Publication No. 2004-149653

DISCLOSURE OF THE INVENTION

Problem to be Solved by the Invention

It is an object of the present invention to solve such problems of prior art and to provide an antistatic white polyester film which has practically adequate reflective performance in a visible light region, can form a film with stability even if inorganic fine particles are added in a high concentration, prevents dirt and dust from adhering to the surface of the film due to having an antistatic coat, can control the gloss levels of the front and back sides of the film and thereby can control a diffusing property of light, and can be suitably used as a base material for a reflector used for a liquid crystal display or an internally illuminated electric ornament signboard.

Means for Solving the Problem

In order to achieve such an object, an antistatic white polyester film for a surface illuminant reflector of the present invention has the following constitution. That is, the antistatic white polyester film for a surface illuminant reflector of the present invention pertains to:

(1)
an antistatic white polyester film for a surface illuminant reflector, having a base material layer formed by using a polyester resin and an antistatic applied layer having the surface resistivity of $3\times10^{12}$ Ω/sq or less at a temperature of 23° C. and at a relative humidity of 50%, wherein
an average reflectivity at a wavelength of 400 to 700 nm is 90% or more on one surface of the polyester film, and
a difference in a gloss level (60) between one surface and the other surface of the polyester film is 5 to 80.

(2)
The antistatic white polyester film for a surface illuminant reflector according to the (1), wherein the gloss level (60) of at least one surface is 20 or less.

(3)
The antistatic white polyester film for a surface illuminant reflector according to the (1) or (2), wherein
the base material layer has a layer A and a layer B,
the layer A is a polyester composition layer including barium sulfate particles having an average particle size of 0.1 to 10 μm in an amount of 21 to 60% by weight relative to that of the layer A and/or rutile-type titanium dioxide particles having an average particle size of 0.1 to 5.0 μm in an amount of 1 to 40% by weight relative to that of the layer A, and
the layer B is a polyester composition layer including barium sulfate particles having an average particle size of 0.1 to 10 μm in an amount 0.1 to 15% by weight relative to that of the layer B and/or rutile-type titanium dioxide particles having an average particle size of 0.1 to 5.0 μm in an amount of 1 to 15% by weight relative to that of the layer B.

(4)
The antistatic white polyester film for a surface illuminant reflector according to the (3), wherein the polyester used in the layer A is a polyethylene terephthalate-based polyester including a copolymerized component in an amount of 1 to 15 mole percent relative to that of total dicarboxylic acid components.

(5)
The antistatic white polyester film for a surface illuminant reflector according to any one of the (1) to (4), wherein the antistatic applied layer is a layer formed by using a composition containing 25 to 80% by weight of at least one binder resin (A) selected from the group consisting of a polyester resin and an acrylic resin, 10 to 60% by weight of an antistatic agent (B) consisted of a polycation polymer, and 1 to 15% by weight of a surfactant (C) are used, taking the sum of the compounds (A), (B) and (C) as 100% by weight.

(6)
The antistatic white polyester film for a surface illuminant reflector according to any one of the (1) to (4), wherein the antistatic applied layer is a layer formed by using a composition including 45 to 80% by weight of at least one binder resin (A) selected from a polyester resin and an acrylic resin, 5 to 40% by weight of a conductive polymer (D), and 1 to 15% by weight of a surfactant (C), taking the sum of the compounds (A), (C) and (D) as 100% by weight.

(7)

The antistatic white polyester film for a surface illuminant reflector according to any one of the (1) to (6), which is used for a reflector of a flat-panel display.

Effect of the Invention

In accordance with the present invention, it is possible to provide an antistatic white polyester film which has practically adequate reflective performance in a visible light region, can form a film with stability even if inorganic fine particles are added in a high concentration, prevents dirt and dust from adhering to the surface of the film due to having an antistatic coat, can control the gloss levels of the front and back sides of the film and thereby can control a diffusing property of light, and can be suitably used as a base material for a reflector used for a liquid crystal display or an internally illuminated electric ornament signboard.

BEST MODE FOR CARRYING OUT THE INVENTION

Hereinafter, the present invention will be described in detail.

[Layer Constitution]

It is necessary that an antistatic white polyester film of the present invention be a polyester film having a base material layer formed by using a polyester resin and an antistatic applied layer having the surface resistivity of $3 \times 10^{12}$ Ω/sq or less at a temperature of 23° C. and at a relative humidity of 50%.

The base material layer of the present invention itself may be a polyester film. The base material layer (polyester film) may be either of a single layer or a multiple layer, but it is preferable that the base material layer be constituted of a polyester composition layer A including barium sulfate particles and/or rutile-type titanium dioxide particles and a polyester composition layer B, which is adjacent to the layer A, including barium sulfate particles and/or rutile-type titanium dioxide particles and an antistatic applied layer be provided in addition to the base material layer. Further, the base material layer of the present invention is preferably a single layer of the layer A or the layer B, or a laminated polyester film including the layer A and the layer B adjacent to the layer A. The base material layer of the present invention may be constituted of multiple layers as long as it includes the constitution of the layer A and the layer B. For example, it may be a two-layer constitution of layer A/layer B, a three-layer constitution of layer B/layer A/layer B, or a four-layer constitution of layer A/layer B/layer A/layer B. Furthermore, it may be a five or more-layer constitution. By employing a multilayer constitution, at the surface of the laminated polyester film, the property of each layer is expressed, and various properties can be controlled.

In consideration of an ease and an effect of film forming, the form of the two-layer constitution or the three-layer constitution consisting of layer B/layer A/layer B is preferable. Particularly, the form in which the layer A is protected by the layer B, that is, the three-layer constitution of layer B/layer A/layer B is preferable.

[Polyester]

As polyester of the polyester composition used in the base material layer of the present invention, polyester including a dicarboxylic acid component and a dial component is used. Examples of dicarboxylic acid include terephthalic acid, isophthalic acid, 2,6-naphthalenedicarboxylic acid, 4,4'-diphenyldicarboxylic acid, adipic acid, and sebacic acid. Examples of diol include ethylene glycol, 1,4-butanediol, 1,4-cyclohexane dimethanol, and 1,6-hexanediol. In the present invention, among these polyesters, polyethylene terephthalate having high stability of film forming and being inexpensive is preferably used as a basic constituent.

When polyethylene terephthalate is used as a basic constituent, it is good to use copolyester containing a copolymerized component preferably in an amount of 1 to 15 mole percent, more preferably in an amount of 3 to 14 mole percent, and most preferably in an amount of 5 to 13 mole percent relative to that of total dicarboxylic acid components from the viewpoint of the stability of film farming. When the amount of the copolymerized component is less than 1 mole percent, there may be cases where a film cannot be formed in the case of a layer containing inert particles, for example, a layer containing 31% by weight or more of barium sulfate particles or rutile-type titanium dioxide particles. When the amount is more than 15 mole percent, there may also be cases where a film cannot be formed.

Examples of the copolymerized component as a dicarboxylic acid component include isophthalic acid, 2,6-naphthalenedicarboxylic acid, 4,4'-diphenyldicarboxylic acid, adipic acid, and sebacic acid. Examples of the copolymerized component as a diol component include ethylene glycol, 1,4-butanediol, 1,4-cyclohexane dimethanol, and 1,6-hexanediol. As a copolymerized component of polyester to be used particularly in the layer A, isophthalic acid, or 2,6-naphthalenedicarboxylic acid is preferably used in order to attain a good film-forming property.

To these polyester resins, various additives, for example, fluorescent brighteners, crosslinking agents, heat stabilizers, antioxidants, ultraviolet absorbers, organic lubricants, fillers, light-resisting agents, nucleating agents, dyes, dispersants, coupling agents, resins incompatible with polyester and the like may be added within the range of not impairing the effects of the present invention.

As the resins incompatible with polyester, crystalline polyolefin resins such as polyethylene, polypropylene, polybutene and polymethylpentene, amorphous cyclic olefin resins such as bicyclo[2,2,1]hept-2-ene, 6-methylbicyclo[2,2,1]hept-2-ene, 5,6-dimethylbicyclo[2,2,1]hept-2-ene, 1-methylbicyclo[2,2,1]hept-2-ene, 6-ethylbicyclo[2,2,1]hept-2-ene, 6-n-butylbicyclo[2,2,1]hept-2-ene, 6-i-butylbicyclo[2,2,1]hept-2-ene, 7-methylbicyclo[2,2,1]hept-2-ene, tricyclo[4,3,0,1$^{2.5}$]-3-decene, 2-methyl-tricyclo[4,3,0,1$^{2.5}$]-3-decene, 5-methyl-tricyclo[4,3,0,1$^{2.5}$]-3-decene, tricyclo[4,4,0,1$^{2.5}$]-3-decene and 10-methyl-tricyclo[4,4,0,1$^{2.5}$]-3-decene, and a compound formed by copolymerization of ethylene with cyclic olefin described above are suitably used. These may be a monopolymer or may be a copolymer, and may be used in combination of two or more of them. Particularly, a resin in which a difference in critical surface tension between itself and polyester is large and which hardly deforms due to a heat treatment after stretching is preferable, and among them, polymethylpentene, and a copolymer of ethylene and bicycloalkene are particularly preferable.

[Barium Sulfate Particles]

The polyester composition in the layer A contains preferably 21 to 60% by weight of barium sulfate particles, more preferably 23 to 55% by weight of barium sulfate particles, and furthermore preferably 25 to 50% by weight of barium sulfate particles. The polyester composition in the layer B contains preferably 0.1 to 15% by weight of barium sulfate particles, more preferably 0.2 to 14% by weight of barium sulfate particles, and furthermore preferably 0.5 to 13% by weight of barium sulfate particles. When the amount of the barium sulfate particles is less than a lower limit of this range, there may be cases where adequate reflective performance cannot be attained due to the lack of scattering light produced by the barium sulfate particles. When the amount of the barium sulfate particles is larger than an upper limit of this range, the stability of film forming may be significantly deteriorated.

In every layer, an average particle size of barium sulfate particles is preferably 0.1 to 10 μm, more preferably 0.3 to 8 μm, and furthermore preferably 0.5 to 5 μm. By employing the particles having an average particle size within this range, good dispersibility and stability of film forming can be obtained. The form of barium sulfate may be plate-like or spherical. The average particle size herein refers to an average particle size on number, and with respect to each particle before the particles are added to a resin (film), particle sizes of one hundred of particles were measured at random at an observation magnification of 10000 times with a scanning electron microscope to determine an average particle size (when the particles were not spherical, the particles were approximated to an ellipse having the closest configuration and the particle size was determined by the equation of (major axis length+minor axis length of the ellipse)/2).

[Rutile-Type Titanium Dioxide Particles]

The polyester composition in the layer A contains preferably 1 to 40% by weight of rutile-type titanium dioxide particles, more preferably 1.5 to 35% by weight of rutile-type titanium dioxide particles, and furthermore preferably 2 to 30% by weight of rutile-type titanium dioxide particles. The polyester composition in the layer B contains preferably 1 to 15% by weight of rutile-type titanium dioxide particles, more preferably 2 to 14% by weight of rutile-type titanium dioxide particles, and furthermore preferably 3 to 13% by weight of rutile-type titanium dioxide particles. When the amount of the rutile-type titanium dioxide particles is less than a lower limit of this range, there may be cases where adequate reflective performance cannot be attained due to the lack of scattering light produced by the rutile-type titanium dioxide particles. When the amount of the rutile-type titanium dioxide particles is larger than an upper limit of this range, the stability of film forming may be significantly deteriorated.

In every layer, an average particle size of rutile-type titanium dioxide particles is preferably 0.1 to 5.0 μm, more preferably 0.2 to 4.0 μm, and furthermore preferably 0.3 to 3.0 μm. By employing the particles having an average particle size within this range, good dispersibility and stability of film forming can be obtained.

As for the rutile-type titanium dioxide, it is preferable to adjust a particle size and remove coarse particles by use of a refining process before the rutile-type titanium dioxides are mixed in the polyester composition. For example, a jet mill or a ball mill can be applied to an industrial means of the refining process as a milling means. For example, a dry type or a wet type centrifuge separation can be applied to the industrial means of the refining process as a classification means. Two or more of these means may be combined to perform refining stepwise. The average particle size herein refers to an average particle size on number, and with respect to each particle before the particles are added to a resin (film), particle sizes of one hundred of particles were measured at random at an observation magnification of 10000 times with a scanning electron microscope to determine an average particle size (when the particles were not spherical, the particles were approximated to an ellipse having the closest configuration and the particle size was determined by the equation of (major axis length+minor axis length of the ellipse)/2).

[Method of Mixing Particles]

As a method for mixing the barium sulfate particles or the rutile-type titanium dioxide in the polyester composition, various methods can be employed. Typical examples of the methods include the following methods. (a) A method in which particles are added before the completion of a transesterification reaction or an esterification reaction during synthesizing the polyester or particles are added before starting a polycondensation reaction. (b) A method in which particles are added to the polyester, and melted and kneaded. (c) A method in which in the method (a) or (b), a master pellet to which a large amount of particles are added is produced, and the pellet and is kneaded with polyester not containing additives to contain a predetermined amount of additives. (d) A method in which the master pellet in the method (c) is used as-is.

When the method (a) of adding particles during synthesizing the polyester is employed, the rutile-type titanium dioxide particles are preferably added to a reaction system as slurry prepared by dispersing the particles in glycol.

As the method for mixing the barium sulfate particles or the rutile-type titanium dioxide, particularly, the method (c) or (d) is preferably employed from the viewpoint of dispersibility of particles.

As for the barium sulfate particles and the rutile-type titanium dioxide particles, it is preferable that a melted polymer be filtrated immediately before extruding the melted polymer from a die with a nonwoven fabric filter with an average mesh of 10 to 100 μm, preferably an average mesh of 15 to 50 μm, constructed of stainless steel wires having a wire diameter of 20 μm or less as a filter in film forming. By doing so, number of coarse aggregated particles can be reduced.

[Method for Film-Forming]

Hereinafter, an example of a method for forming a film of the present invention will be described.

First, a melted polyester composition is extruded from a die by a simultaneous multi-layer extrusion with a feed block to produce a laminated non-stretched sheet being a base material layer. That is, a melted substance of the polyester composition forming the layer A and a melted substance of the polyester composition forming the layer B are laminated so as to be, for example, a constitution of layer B/layer A/layer B by use of a feed block, developed into a die and extruded. In this time, the polyester compositions laminated so as to be a constitution of layer B/layer A/layer B by use of a feed block maintains the laminated form. In addition, a laminated film can also be produced with a multi-manifold die, but it is more preferable to produce the laminated film with the feed block from the viewpoint of the adhesion at the interface between layers of the laminated film as well as ease of production.

The polyester composition extruded from the die is cooled and solidified on a casting drum to become a non-stretched laminated film. This non-stretched laminated film is heated by heating means such as roll heating and infrared heating, and stretched in a longitudinal direction first to obtain a longitudinally stretched film. This stretching is preferably performed by use of the circumferential speed difference between two or more rolls. A stretching temperature is a glass transition temperature (Tg) of polyester or higher and stretching is performed at a draw ratio of 2.5 to 4.0.

The longitudinally stretched film is subsequently subjected to the treatments of stretching in a widthwise direction, heat setting, and heat relaxation in turn to obtain a biaxially oriented film, and these treatments are performed while running the film. A stretching treatment in a widthwise direction starts from a temperature higher than a glass transition temperature (Tg) of polyester. This treatment is performed up to a temperature higher than the Tg by 5 to 70° C. while raising temperature. The temperature in a process of stretching in a widthwise direction may be raised continuously or stepwise (step by step), but the temperature is usually raised step by step. For example, a stretching zone in a widthwise direction of a tenter is divided into a plurality of zones along a running direction of a film and a heating medium of a predetermined temperature is passed through each zone and thereby the temperature is raised. Stretching in a width direction is performed at a draw ratio of 2.5 to 4.5.

In order to complete the crystalline orientation of the resulting biaxially stretched film being a base material layer to impart planarity and dimensional stability, subsequently, heat treatment is performed at a temperature of 120 to 240° C. for 1 to 30 seconds in the tenter, and then the biaxially stretched film is slowly cooled uniformly to room temperature, and thereafter, a surface on which an applied layer is not formed is optionally subjected to a corona discharge treatment in order to further enhance the adhesion property to another material and the biaxially stretched film is wound to obtain the white polyester film of the present invention. A relaxation treatment of 3 to 12% in a widthwise direction or longitudinal direction may be optionally applied during the heat treatment step.

[Antistatic Applied Layer]

The antistatic applied layer in the present invention has the surface resistivity of $3 \times 10^{12}$ Ω/sq or less at a temperature of 23° C. and at a relative humidity of 50% for the purpose of preventing the adhesion of dirt and dust, preferably the surface resistivity of $1 \times 10^{12}$ Ω/sq or less, and more preferably the surface resistivity of $5 \times 10^{11}$ Ω/sq or less. When the surface resistivity is more than $3 \times 10^{12}$ Ω/sq, an antistatic effect is small and the adhesion of dirt and dust cannot be prevented. The lower limit of the surface resistivity is not particularly limited, but it is preferably $1 \times 10^{5}$ Ω/sq or more from the viewpoint of production cost and stability of film forming.

When the antistatic applied layer is provided, surface roughness can be changed to control the gloss level.

This antistatic applied layer can be obtained by applying a water-based coating solution of the composition including 25 to 80% by weight of at least one binder resin (A) selected from the group consisting of a polyester resin and an acrylic resin, 10 to 60% by weight of an antistatic agent (B) consisted of a polycation polymer, and 1 to 15% by weight of a surfactant (C), taking the sum of the compounds (A), (B) and (C) as 100% by weight, drying the applied coating solution and stretching the resulting film.

A proportion of the binder resin (A) in solid matter components in this water-based coating solution is 25 to 80% by weight, and preferably 35 to 65% by weight. When this proportion is less than 20% by weight, the adhesive force of a coat (antistatic coat) to a polyester film may be insufficient, and when the proportion is more than 80% by weight, a blocking property of a film to which the binder resin (A) is applied may be deteriorated.

A proportion of the antistatic agent (B) consisted of a polycation polymer in solid matter components is 10 to 60% by weight, and preferably 15 to 50% by weight. When this proportion is less than 10% by weight, the antistatic property may be insufficient, and when the proportion is more than 60% by weight, the adhesive force of a coat to a polyester film may be insufficient.

A proportion of the surfactant (C) in solid matter components is 1 to 15% by weight, and preferably 3 to 10% by weight. When this proportion is less than 1% by weight, the wettability of the water-based coating solution to a polyester film may be insufficient, and when the proportion is more than 15% by weight, the adhesive force of a coat to a polyester film may be insufficient or blocking resistance of a coat may be insufficient.

Further, this antistatic applied layer can also be obtained by applying a water-based coating solution of the composition including 45 to 80% by weight of at least one binder resin (A) selected from the group consisting of a polyester resin and an acrylic resin, 5 to 40% by weight of a conductive polymer (D), and 1 to 15% by weight of a surfactant (C), taking the sum of the compounds (A), (C) and (D) as 100% by weight, drying the applied coating solution and stretching the resulting film.

A proportion of the binder resin (A) in solid matter components in this water-based coating solution is 45 to 80% by weight, preferably 45 to 75% by weight, and more preferably 50 to 70% by weight. When this proportion is less than 45% by weight, the adhesive force of the antistatic applied layer to a polyester film (base material layer) may be insufficient, and when the proportion is more than 80% by weight, a blocking property of the antistatic white polyester film being a film to which the binder resin (A) is applied, may be deteriorated.

A proportion of the conductive polymer (D) in solid matter components in this water-based coating solution is 5 to 40% by weight, and preferably 8 to 35% by weight. When this proportion is less than 5% by weight, the antistatic property may be insufficient, and when the proportion is more than 40% by weight, the adhesive force of a coat to a polyester film may be insufficient.

A proportion of the surfactant (C) in solid matter components in this water-based coating solution is 1 to 15% by weight, and preferably 3 to 10% by weight. When this proportion is less than 1% by weight, the wettability of the water-based coating solution to a polyester film may be insufficient, and when the proportion is more than 15% by weight, the adhesive force of a coat to a polyester film may be insufficient or blocking resistance of a coat may be insufficient.

The antistatic applied layer is preferably located at the uppermost layer of the antistatic white polyester film.

[Binder Resin (A)]

In the present invention, the binder resin (A) added to the antistatic coat is preferably at least one binder resin selected from a copolyester resin (A-1) and an acrylic copolymer (A-2) from the viewpoint of adhesion to a polyester film and a blocking property.

Examples of an acid component constituting this copolyester resin (A-1) include terephthalic acid, isophthalic acid, 2,6-naphthalenedicarboxylic acid, 1,4-cyclohexanedicarboxylic acid, adipic acid, sebacic acid, phenylindanedicarboxylic acid, and dimeric acid. These components may be used in combination of two or more of them. Furthermore, in addition to these components, unsaturated polybasic acid such as maleic acid, fumaric acid, and itaconic acid, or hydroxycarboxylic acid such as p-hydroxybenzoic acid and p-(β-hydroxyethoxy)benzoic acid can be used in a small proportion. A proportion of the unsaturated polybasic acid component or the hydroxycarboxylic acid component is at most 10 mole percent, and preferably 5 mole percent or less. Examples of a polyol component include ethylene glycol, 1,4-butanediol, neopentyl glycol, diethylene glycol, dipropylene glycol, 1,6-hexanediol, 1,4-cyclohexane dimethanol, xylilene glycol, dimethylol propionic acid, glycerol, trimethylolpropane, poly(ethyleneoxy)glycol, and poly(tetramethyleneoxy)glycol. These components may be used in combination of two or more of them.

Further, it is possible to copolymerize the copolyester resin (A-1) with some amount of a compound having a sulfonate group or a compound having a carboxylate group in order to facilitate the conversion to a water-based solution, and it is preferable to do so.

Examples of compounds having this sulfonate group preferably include alkali metal sulfonate compounds or amine sulfonate compound such as 5-sodium sulfoisophthalic acid, 5-ammonium sulfoisophthalic acid, 4-sodium sulfoisophthalic acid, 4-methylammonium sulfoisophthalic acid, 2-sodium sulfoisophthalic acid, 5-potassium sulfoisophthalic acid, 4-potassium sulfoisophthalic acid, 2-potassium sulfoisophthalic acid and sodium sulfosuccinate. Further, examples of compounds having this carboxylate group include trimellitic anhydride, trimellitic acid, pyromellitic anhydride, pyromellitic acid, trimesic acid, cyclobutanetetracarboxylic acid, dimethylolpropionic acid, or monoalkali metal salt thereof. In addition, a free carboxyl group is reacted with an alkali metal compound or an amine compound after copolymerization to be converted to a carboxylate group.

The copolyester resin can also be used as a modified polyester copolymer, for example, a block polymer obtained by modifying the polyester copolymer with an acrylic resin, a polyurethane resin, a silicone resin, an epoxy resin or a phenolic resin, or a graft polymer.

Such a copolyester resin can be produced by a hitherto known or used polyester production technology. For example, the copolyester resin can be produced by a method in which 2,6-naphthalenedicarboxylic acid or ester-forming derivatives thereof (particularly, dimethyl ester), isophthalic acid or ester-forming derivatives thereof (particularly, dimethyl ester) and trimellitic anhydride are reacted with propylene oxide adduct of ethylene glycol and bisphenol A to form monomer or oligomer, and thereafter this monomer or oligomer is subjected to a polycondensation reaction in a vacuum to form a copolyester having a predetermined intrinsic viscosity (it is preferable that intrinsic viscosity measured at 35° C. by use of o-chlorophenol be 0.2 to 0.8), and further a free carboxyl group is reacted with an alkali compound or an amine compound into salt. In this time, it is preferable to use a catalyst for accelerating the reaction, for example, an esterification catalyst or a transesterification catalyst, or a polycondensation catalyst, and various additives, for example, a stabilizer, may be added.

In the present invention, examples of the components constituting an acrylic copolymer (A-2) to be used as a binder resin (A) added to the antistatic coat include acrylic acid, methyl acrylate, ethyl acrylate, butyl acrylate, sodium acrylate, ammonium acrylate, 2-hydroxyethyl acrylate, methacrylic acid, methyl methacrylate, ethyl methacrylate, butyl methacrylate, sodium methacrylate, ammonium methacrylate, 2-hydroxyethyl methacrylate, glycidyl methacrylate, acryl methacrylate, sodium vinylsulfonate, sodium methallylsulfonate, sodium styrene sulfonate, acrylamide, methacrylamide, and N-methylolmethacrylamide. These monomers can also be used in combination with another unsaturated monomer such as styrene, vinyl acetate, acrylonitrile, methacrylonitrile, vinyl chloride, vinylidene chloride, and divinylbenzene.

The acrylic copolymer can also be used as a modified acrylic copolymer, for example, a block polymer obtained by modifying the acrylic copolymer with a polyester resin, a polyurethane resin, a silicone resin, an epoxy resin or a phenolic resin, or a graft polymer.

[Antistatic Agent B Consisted of Polycation Polymer]

The antistatic agent B consisted of a polycation polymer in the present invention is a polymer having a structure expressed by the following formula (I) as a main repeat unit.

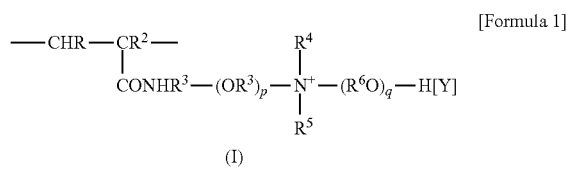

[Formula 1]

(I)

(wherein, $R^1$ and $R^2$ are each H or $CH_3$, $R^3$ is an alkylene group having 2 to 10 carbon atoms, $R^4$ and $R^5$ are each a saturated hydrocarbon group having 1 to 5 carbon atoms, $R^6$ is an alkylene group having 2 to 10 carbon atoms, p is an integer of 1 to 20, q is an integer of 1 to 40, $Y^-$ is a halogen ion, a monohalogenated or polyhalogenated alkyl ion, a nitrate ion, a sulfate ion, an alkyl sulfate ion, a sulfonate ion or alkyl sulfonate ion).

Among the antistatic agents expressed by the formula (I), an antistatic agent, in which $Y^-$ in the formula (I) is the alkyl sulfonate ion expressed by $R^7SO_3^-$ (wherein $R^7$ is a saturated hydrocarbon group having 1 to 5 carbon atoms), $R^3$ in $—(OR^3)_m—$ is an ethylene group, p is an integer of 1 to 20, $R^6$ in $—(R^6O)_n—$ is an ethylene group, and q is an integer of 1 to 40, has a good adhesive property between the coat and the polyester film and a good heat resistance of the coat, and particularly has an excellent antistatic property, and therefore it is preferable.

This antistatic agent (B) can be preferably produced by, for example, the following method. That is, an acrylic acid ester monomer is converted to polyacrylic acid ester having a weight average molecular weight of 2000 to 100000 by emulsion polymerization, and then this ester is reacted with N,N-dialkylaminoalkylamine (for example, N,N-dimethylaminopropylamine, N,N-diethylaminopropylamine, etc.) to be amidated, and a quaternary hydroxyalkylation reaction is ultimately performed to introduce a quaternary cation pair, and thereby the antistatic agent (B) can be produced.

In the antistatic agent (B), it is preferable that the $Y^-$ in the formula (I) be $CH_3SO_3^-$, $C_2H_5SO_3^-$, or $C_3H_7SO_3^-$, $—(OR^3)_m-be-(OC_2H_4)_m—$, and p be an integer 1 to 5. Further, it is preferable that $—(R^6O)_n-be-(C_2H_4O)_n—$ and q be an integer of 1 to 10.

As the antistatic agent B consisted of a polycation polymer, polymers expressed by the following formulas (II), (III) can be suitably employed.

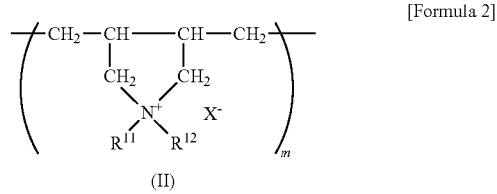

[Formula 2]

(II)

(X = Br, Cl, $CH_3SO_3$, $C_2H_5SO_3$)

The above $R^{11}$ and $R^{12}$ are each an alkyl group, a cycloalkyl group, or an aryl group, each having 1 to 10 carbon atoms. Among them, an alkyl group having 1 to 6 carbon atoms is preferable.

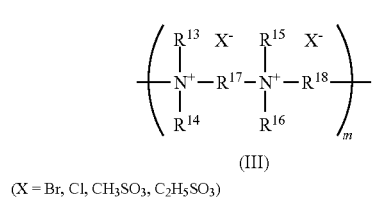

(III)

(X = Br, Cl, CH$_3$SO$_3$, C$_2$H$_5$SO$_3$)

[Formula 3]

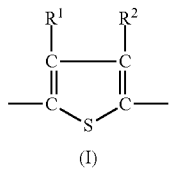

(I)

[Formula 4]

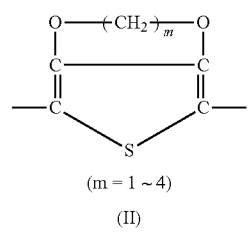

(m = 1 ~ 4)

(II)

[Formula 5]

The above $R^{13}$ to $R^{16}$ are each an alkyl group, a cycloalkyl group, or an aryl group, each having 1 to 10 carbon atoms, and the above $R^{17}$ and $R^{18}$ are each an alkylene group, a cycloalkylene group, an arylene group, an alkylene group, or a divalent aliphatic group containing a heteroatom (O, N, etc.), each having 2 to 10 carbon atoms. Examples of the aliphatic group include —CH(OH)CH$_2$—, —CH$_2$CH(OH)CH$_2$—, and —CH$_2$CH$_2$CH$_2$NHCOCH$_2$CH$_2$CH$_2$—.

These may be used as a homopolymer or may be used by being copolymerized with another unsaturated monomer. When the polymer is used by being copolymerized with another unsaturated monomer, a proportion of the repeat unit composing the resulting copolymer is preferably 50 mole percent or more. When this proportion is less than 50 mole percent, an antistatic property is insufficient. Examples of other unsaturated monomers include methyl acrylate, ethyl acrylate, butyl acrylate, 2-hydroxyethyl acrylate, methyl methacrylate, ethyl methacrylate, butyl methacrylate, 2-hydroxyethyl methacrylate, methyl crotonate, glycidyl methacrylate, acryl methacrylate, acrylamide, methacrylamide, N-methylolacrylamide, ethylene, styrene, vinyl acetate, acrylonitrile, methacrylonitrile, vinyl chloride, vinylidene chloride, divinylbenzene, acrylic acid, methacrylic acid, maleic acid, and fumalic acid.

[Surfactant (C)]

It is preferable to mix the surfactant (C) in the antistatic coat in the present invention in order to enhance the adhesive property between the coat and the polyester film and improve the blocking resistance of the antistatic laminated film. Examples of such a surfactant (C) include nonionic surfactants such as an alkyleneoxide monopolymer, an alkyleneoxide copolymer, an alkyleneoxide adduct of aliphatic alcohol, an alkyleneoxide addition-polymerization product of long chain aliphatic substituted phenol, polyhydric alcohol aliphatic ester and long chain aliphatic amide alcohol, and cationic or anionic surfactants such as compounds having quaternary ammonium salt, compounds having alkylpyridinium salt and compounds having sulfonic acid salt, and particularly nonionic surfactants have excellent effects on the adhesive property between the coat and the polyester film and the blocking resistance of the antistatic polyester film

[Conductive Polymer (D)]

Examples of the conductive polymer (D) in the present invention include antistatic polymers obtained by polymerizing thiophene and/or thiophene derivatives, and antistatic polymers obtained by polymerizing pyrrole and/or pyrrole derivatives.

The antistatic polymer obtained by polymerizing thiophene and/or thiophene derivatives is a monopolymer or copolymer including a unit expressed by the following formula (I) and/or formula (II) as a main component, and may be a copolymer including a small amount of another polymerization unit as a copolymerized component.

In the above formula (I), $R^1$ and $R^2$ are each an hydrogen element (—H), an aliphatic hydrocarbon group, alicyclic hydrocarbon group or aromatic hydrocarbon group, having 1 to 20 carbon atoms, a hydroxyl group (—OH), a group having a hydroxyl group at terminals (—R$^3$OH: $R^3$ is a bivalent hydrocarbon group (for example, an alkylene group, an arylene group, a cycloalkylene group, an alkylene-arylene group) having 1 to 20 carbon atoms), an alkoxy group (—OR$^4$: $R^4$ is a hydrocarbon group having 1 to 20 carbon atoms), a group having an alkoxy group at terminals (—R$^3$OR$^5$: $R^5$ is an alkyl group having 1 to 4 carbon atoms), a carboxyl group (—COOH), a carboxylate group (—COOM: M is an alkali metal element, quaternary amine or tetraphosphonium), a group having a carboxyl group at terminals (—R$^3$COOH), a group having a carboxylate group at terminals (—R$^3$COOM), an ester group (—COOR$^5$), a group having an ester group at terminals (—R$^3$COOR$^5$), a sulfonic acid group (—SO$_3$H), a sulfonate group (—SO$_3$M), a group having a sulfonate group at terminals (—R$^3$SO$_3$M), a sulfonyl group (—SO$_2$R$^4$), a group having a sulfonyl group at terminals (—R$^3$SO$_2$R$^4$), a sulfenyl group (—S(=O)R$^4$), a group having a sulfenyl group at terminals (—R$^3$S(=O)R$^4$), an acyl group (—C(=O)R$^6$: $R^6$ is a hydrocarbon group having 1 to 10 carbon atoms), a group having an acyl group at terminals (—R$^3$C(=O)R$^6$), an amino group (—NH$_2$), a group having an amino group at terminals (—R$^3$NH$_2$), a group in which a part or all of hydrogen of an amino group is substituted (—NR$^7$R$^8$: $R^7$ is a hydrogen element, an alkyl group having 1 to 3 carbon atoms, —CH$_2$OH or —CH$_2$OR$^6$, and $R^8$ is an alkyl group having 1 to 3 carbon atoms, —CH$_2$OH or —CH$_2$OR$^6$), a group having a group in which a part or all of hydrogen of an amino group is substituted at terminals (—R$^3$NR$^7$R$^8$), a carbamoyl group (—CONH$_2$), a group having a carbamoyl group at terminals (—R$^3$CONH$_2$ or R$^3$NHCONH$_2$), a group in which a part or all of hydrogen of a carbamoyl group is substituted (—CONR$^7$R$^8$), a group having a group in which a part or all of hydrogen of a carbamoyl group is substituted at terminals (—R$^3$CONR$^7$R$^8$), a halogen group (—F, —Cl, —Br, —I), a group in which a part of hydrogen elements in $R^4$ is substituted with a halogen element(s), a group expressed by —[NR$^1$R$^2$R$^{9+}$][X$^-$] ($R^9$ is a hydrogen element or a hydrocarbon group having 1 to 20 carbon atoms, X$^-$ is an ion expressed by F$^-$, Cl$^-$, Br$^-$, I$^-$, R$^1$OSO$_3^-$, R$^1$SO$_3^-$, NO$_3^-$ or R$^1$COO$^-$), a phosphate group (—P(=O)(OM)$_2$), a group having a phosphate group at terminals (—R$^3$P(=O)(OM)$_2$), an oxirane group, or a group having an oxirane group at terminals.

A doping agent may be mixed in the antistatic polymers obtained by polymerizing thiophene and/or thiophene derivatives in an amount of, for example, 0.1 to 500 parts by weight relative to 100 parts by weight of the antistatic polymer in order to improve the antistatic property. Examples of this doping agent include LiCl, $R^{10}COOLi$ ($R^{10}$: a saturated hydrocarbon group having 1 to 30 carbon atoms), $R^{10}SO_3Li$, $R^{10}COONa$, $R^{10}SO_3Na$, $R^{10}COOK$, $R^{10}SO_3K$, tetraethylammonium, $I_2$, $BF_3Na$, $BF_4Na$, $HClO_4$, $CF_3SO_3H$, $FeCl_3$, tetracyano quinoline (TCNQ), $Na_2B_{10}Cl_{10}$, phthalocyanine, porphyrin, glutamine III, alkylsulfonate, polystyrenesulfonic acid, sodium (K, Li) polystyrene sulfonate, sodium (K, Li) styrene-styrenesulfonate copolymer, styrenesulfonic acid anion, and styrenesulfonic acid-styrenesulfonic acid anion copolymer.

Particularly, a compound (the following formula (IV)), which is a monopolymer or copolymer including a unit expressed by the formula (II) as a main component and a combination with polystyrenesulfonic acid as a doping agent, is preferable.

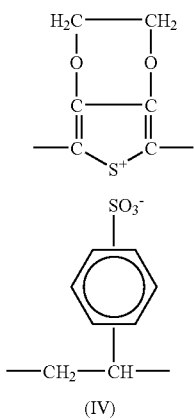

[Formula 6]

(IV)

The antistatic polymer obtained by polymerizing pyrrole and/or pyrrole derivatives is a monopolymer or copolymer including a unit expressed by, for example, the following structural formula as a main component, and may be a copolymer including a small amount of another polymerization unit as a copolymerized component.

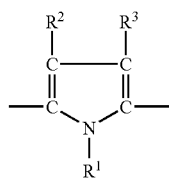

[Formula 7]

wherein, $R^1$ is hydrogen or an alkyl group, $R^2$ and $R^3$ are each hydrogen, an alkyl group, a carboxylate group or sulfonate group-containing group, a halogen-containing group, an ester group or ether group.

The antistatic polymer can be produced by polymerizing these pyrroles or pyrrole derivatives by a publicly known method (for example, an oxidation polymerization method, an electrolytic polymerization method, etc.). As this pyrrole and pyrrole derivative, pyrrole in which $R^1$ to $R^3$ are hydrogen, pyrrole derivatives in which $R^1$ and $R^3$ are hydrogen and $R^2$ is an alkyl group, and pyrrole derivatives in which $R^1$ is hydrogen and $R^2$ and $R^3$ are each an alkyl group can be preferably exemplified. Further, examples of the pyrrole derivatives preferably include N-substituted pyrrole such as pyrrole and N-alkylpyrrole; 3-alkylpyrrole, 3,4-dialkylpyrrole, 3-alkoxypyrrole, 3,4-dialkoxypyrrole, 3-chloropyrrole, and 3,4-dichloropyrrole, which have an alkyl group of C1 to C6, an alkoxy group or a halogen group at position 3 or positions 3, 4.

[Water-Based Coating Solution]

In the present invention, the antistatic layer can be provided by applying a water-based coating solution of the composition including the components to at least one surface of a polyester film, drying the applied coating solution and stretching the resulting film. The water-based coating solution to be used is a coating solution (water-based coating solution) in which water is used as a medium and the composition including the components is dissolved and/or dispersed. The water-based coating solution may include some amount of an organic solvent for the purpose of helping the stability of a coating solution. Examples of the organic solvent include methyl ethyl ketone, acetone, ethyl acetate, tetrahydrofuran, dioxane, cyclohexanone, n-hexane, toluene, xylene, methanol, ethanol, n-propanol, and isopropanol. The water-based coating solution may include two or more organic solvents.

In the present invention, additives, for example, other surfactants, ultraviolet absorbers, pigments, lubricants, anti-blocking agents, water-soluble polymer resins, crosslinking agents such as oxazoline, melamine, epoxy and aziridine, and other antistatic agents, may be mixed in the water-based coating solution within the range of not impairing the object of the present invention.

The concentration of the solid matter in the water-based coating solution in the present invention is generally set at 5 to 30% by weight from the viewpoint of appearance of coat.

[Application of Coat]

In the production of the present invention, a water-based coating solution of a composition including the components is applied to at least one surface of a polyester film. This polyester film is preferably a polyester film before crystalline orientation being completed. Examples of this polyester film before crystalline orientation being completed include a non-stretched laminated film prepared by heat-melting polyester to form it into a film form as-is, a monoaxially stretched laminated film prepared by stretching the non-stretched laminated film in either a longitudinal direction or a widthwise direction, and a biaxially stretched laminated film prepared by stretching the non-stretched laminated film in two directions of a longitudinal direction and a widthwise direction at a low draw ratio and be further stretchable (a biaxially stretched film before re-stretching the film in a longitudinal direction and a widthwise direction to ultimately complete crystalline orientation).

As a method for applying the water-based coating solution to the polyester film, any publicly known coating method can be employed. For example, a roller coating method, a gravure coating method, a microgravure coating method, a reverse coating method, a roller brush method, a spray coating method, an air knife coating method, a dipping method and a curtain coating method may be employed alone or in combination thereof.

In the present invention, a water-based coating solution for a coat is applied to a polyester film being running at a rate of 0.5 to 50 g per square meters of a polyester film and then dried, and the coated film is preferably subjected to stretching. This drying is preferably performed at 90 to 130° C. for 2 to 20 seconds. This drying can also serves as preheating for stretching treatment or heating in stretching. In this time, a thickness of an ultimately dried coat (film) becomes 0.02 to 1 μm and a uniform coat is formed.

[Physical Property]

A thickness of the biaxially stretched polyester film of the present invention thus obtained is preferably 25 to 250 μm, more preferably 30 to 220 μm, and particularly preferably 40 to 200 μm. When the thickness is 25 μm or less, the reflectivity is reduced and therefore it is not preferable, and when the thickness is more than 250 μm, an increase in the reflectivity cannot be expected even if a film is thicker and therefore it is not preferable from the viewpoint of cost and stability of film forming.

A reflectivity of at least one surface of the polyester film of the present invention is preferably 90% or more, more preferably 92% or more, and particularly preferably 94% or more in terms of an average reflectivity at a wavelength of 400 to 700 nm. When the reflectivity is less than 90%, it is not preferable since adequate brightness of a screen cannot be obtained. The upper limit of the reflectivity is not particularly limited, but it is preferably 110% or less from the viewpoint of stability of film forming and cost. The reflectivity within the range can be preferably achieved by the addition of white inorganic fine particles and the formation of air bubble generated by virtue of the inorganic fine particles in stretching the polyester film.

The reflectivity in the case where an integrating sphere was attached to a spectrophotometer (UV-2450 manufactured by Shimadzu Corporation) and a $BaSO_4$ white plate was taken as 100% was measured over a wavelength of 400 to 700 nm. The reflectivity was read from the resulting chart at 2 nm intervals to determine an average value within the range.

The gloss level reflects the roughness of the surface, and the gloss level becomes lower and the diffusing property of light becomes higher as the roughness of the surface increases. Further, when a difference in the gloss level between one surface and the other surface of the polyester film is large, it is easy to distinguish the front surface from the rear surface and this difference is necessary from the viewpoint of workability in assembly. Therefore, a difference in a gloss level between the front surface and the rear surface of the polyester film is 5 to 80, preferably 7 to 75, and more preferably 10 to 70. When the difference between the front surface and the rear surface is less than 5, it is not preferable since it is difficult to distinguish between the front surface and the rear surface of a polyester film. When the difference is more than 80, it is not preferable since the surface having a higher gloss level is susceptible to a flaw. The gloss level within the range can be preferably achieved by providing the antistatic coat described above or putting the polyester film into a two-layer constitution of layer A/layer B to change the surface roughness.

Furthermore, the gloss level of at least one surface of the polyester film is preferably 20 or less, and more preferably 18 or less. When the gloss level is more than 20, it is not preferable because adequate reflective performance cannot be obtained due to an insufficient diffusing property of light. The gloss level can be preferably achieved by providing the antistatic coat on at least one surface of the polyester film or adding inorganic fine particles.

The gloss level was measured with a glossmeter (UGV-5D manufactured by SUGA TEST INSTRUMENTS CO., LTD according to JIS K 7105 (1981).

EXAMPLES

Hereinafter, the present invention will be described in detail by way of examples. In addition, each property was measured by the following method.

(1) Thickness of Film

Thicknesses of ten points of a film sample were measured with a calibrated digital micrometer (M-30 manufactured by Sony Precision Technology Inc.) and an average value of 10 measurements was taken as a thickness of a film.

(2) Thickness of Each Layer

We cut samples into triangular shapes and set them embedded by some epoxide resin. The embedded sample was sliced in a longitudinal direction parallel to a cross section with a Microtome (ULTRACUT-S) to form thin-pieces with a thickness of 50 nm, these thin-pieces were observed at an observation magnification of 300 times and acceleration voltage of 3.0 kV with an S-2100A type scanning electron microscope manufactured by Hitachi, Ltd. and photographed, and a thickness of each layer was measured from this photograph to determine an average thickness.

(3) Average Particle Size

With respect to each particle before being added to a resin (film), particle sizes of one hundred of particles were measured at random at an observation magnification of 10000 times with an S-2100A type scanning electron microscope manufactured by Hitachi, Ltd. to determine an average particle size (when the particles were not spherical, the particles were approximated to an ellipse having the closest configuration and the particle size was determined by the equation of (major axis length+minor axis length of the ellipse)/2).

(4) Stability of Film Forming

According to the following criteria, it was evaluated whether film formation could be performed with stability or not.

○: Film formation can be performed with stability for 1 hour or more x: Break is produced within 1 hour and stable film formation cannot be performed.

(5) Adhesion Property of Coat

According to the following criteria, it was evaluated whether the coat was adhered to the polyester film or not.

○: The ability of a coating solution to be applied to a polyester film is high and a uniform coat is formed.

x: The ability of a coating solution to be applied to a polyester film is low and nonuniform coating is produced.

(6) Reflectivity

A reflectivity in the case where an integrating sphere was attached to a spectrophotometer (UV-2450 manufactured by Shimadzu Corporation) and a $BaSO_4$ white plate was taken as 100% was measured over a wavelength of 400 to 700 nm. The reflectivity was read from the resulting chart at 2 nm intervals to determine an average value within the range. The $BaSO_4$ white plate was prepared by filling $BaSO_4$ powders (DIN 5033 manufactured by Merck Ltd., Japan) into a powder sample holder.

(7) Gloss Level (60°)

The gloss level was measured with a glossmeter (UGV-5D manufactured by SUGA TEST INSTRUMENTS CO. LTD.) according to JIS K 7105 (1981). The gloss level was measured at an incident angle of 60° and a light-receiving angle of 60° five times for every surface and an average value of 5 measurements on each surface was taken as the gloss level of each surface.

(8) Surface Resistivity (Antistatic Property)

As for the surface resistivity of a film, under the conditions of a setting temperature of 23° C. and a relative humidity of 50%, the surface resistivity ($\Omega$/sq) was measured after application of an applied voltage of 500 V for 1 minute using a digital super high resistance/minute ammeter R8340A (manufactured by Advantest Corp.).

(9) Dust Adhesion (Ash Test)

A white polyester film cut into a size A4 was subjected to humidification for 24 hours in a measuring atmosphere at 23° C. and a relative humidity of 50%. The surface of the film subjected to humidification was scrubbed to and fro with a scrubbing cloth (100% wool). Immediately after this, the film was gradually brought close to 1.5 g of cigarette ash, which was pre-dried at 70° C. for 1 hour and spread out over an area of 10 cm×10 cm on a desk, to be brought into contact with it. Adhesion of the cigarette ash was visually observed and determined. Symbols "○" and "Δ" indicate good dust adhesion.

○: When a film is brought close to ash, the ash does not adhere to the film.

Δ: When a film is brought into contact with ash, the ash adheres to the film.

x: By only bringing a film close to ash, the ash adheres to the film.

Examples 1 to 10

Inorganic fine particles shown in Table 1 were added to each copolymerized resin shown in table 2, and the resulting resin was fed to two extruders heated to 280° C. An A-layer polymer and a B-layer polymer joined into one with a multi-layer feed block type apparatus making the A-layer and the B-layer into a constitution of B-layer/A-layer/B-layer or A-layer/B-layer, and the resulting multi-layer was extruded into a sheet form from a die while maintaining its laminated state. Furthermore, a non-stretched film obtained by cooling and solidifying this sheet with a chill drum having a surface temperature of 25° C. was heated to 90° C. and stretched by 2.9 times in a lengthwise direction (longitudinal direction) and cooled by a series of rolls of 25° C. A water-based coating solution described below was applied to one surface or both surfaces of this monoaxially stretched film in an amount of 4 g/m$^2$ (wet) by a microgravure coating method. As the water-based coating solution, 10% by weight of the water-based solution of solid matter composition in the proportions shown in Table 1, including copolyester (Tg=51° C.) (binder resin A) containing terephthalic acid [67 mole percent], isophthalic acid [27 mole percent] and 5-sodium sulfoisophthalic acid [6 mole percent] as an acid component, and ethylene glycol [30 mole percent], diethylene glycol [40 mole percent] and neopentyl glycol [30 mole percent] as a glycol component, an antistatic agent B (sodium polystyrene sulfonate (CHEMISTAT SA-9 produced by Sanyo Chemical Industries, Ltd.)) or a conductive polymer D (polythiophene water-dispersed matter (Baytron P produced by Bayer AG)) and polyoxyethylene lauryl ether (surfactant C), was used. Subsequently, the film in which the coating solution was dried was led to a tenter while grasping both ends of the film with clips and stretched by 3.7 times in a direction orthogonal to a longitudinal direction (a width direction) in an atmosphere heated to 120° C. Thereafter, the film was subjected to heat fixation at 210° C. in the tenter, and then cooled to room temperature to obtain a biaxially stretched film. Physical properties as a reflector base material of the resulting film were as shown in Table 2. In any film, an antistatic property was good for at least one surface.

TABLE 1

| | A-layer film | | | | | | B-layer film | | | | | | Composition of coating solution | | Constituent ratio of layer |
|---|---|---|---|---|---|---|---|---|---|---|---|---|---|---|---|
| | Copolyester | | | Inorganic fine particle | | | Copolyester | | | Inorganic fine particle | | | A-surface | B-surface | |
| | Main skeleton | Copolymer component Component | mol % | Material | Additive amount/Average particle size % by weight/μM | | Main skeleton | Copolymer component Component | mol % | Material | Additive amount/Average particle size % by weight/μM | | % by weight | % by weight | |
| Example 1 | PET | NDC | 10 | Titanium dioxide | 30/1.5 | | PET | NDC | 10 | Titanium dioxide | 7.5/1.5 | | A: 50, B: 50, C: 10 | — | B/A/B = 15/70/15 |
| Example 2 | PET | NDC | 10 | Titanium dioxide | 30/1.5 | | PET | NDC | 10 | Titanium dioxide | 7.5/1.5 | | — | A: 50, B: 40, C: 10 | B/A/B = 15/70/15 |
| Example 3 | PET | IPA | 10 | Barium sulfate | 40/1.2 | | PET | IPA | 10 | Barium sulfate | 5.0/1.2 | | A: 60, B: 30, C: 10 | — | B/A/B = 10/80/10 |
| Example 4 | PET | IPA | 10 | Barium sulfate | 40/1.2 | | PET | IPA | 10 | Barium sulfate | 5.0/1.2 | | — | A: 60, D: 30, C: 10 | B/A/B = 10/80/10 |
| Example 5 | PET | CHDM | 8 | Calcium carbonate | 50/1.2 | | PET | CHDM | 8 | Calcium carbonate | 5.0/1.2 | | A: 60, B: 30, C: 10 | A: 70, D: 20, C: 10 | B/A/B = 20/60/20 |
| Example 6 | PET | CHDM | 8 | Calcium carbonate | 50/1.2 | | PET | CHDM | 8 | Calcium carbonate | 5.0/1.2 | | A: 70, D: 20, C: 10 | A: 60, B: 30, C: 10 | B/A/B = 20/60/20 |
| Example 7 | PET | NDC | 10 | Titanium dioxide | 30/1.5 | | PET | NDC | 10 | Titanium dioxide | 7.5/1.5 | | A: 60, B: 35, C: 5 | A: 60, B: 35, C: 5 | A/B = 70/30 |
| Example 8 | PET | NDC | 10 | Titanium dioxide | 30/1.5 | | PET | NDC | 10 | Titanium dioxide | 7.5/1.5 | | A: 60, B: 30, C: 10 | A: 60, D: 30, C: 10 | A/B = 70/30 |
| Example 9 | PET | IPA | 10 | Barium sulfate | 40/1.2 | | PET | IPA | 10 | Barium sulfate | 5.0/1.2 | | A: 90, B: 10 | A: 50, D: 50 | B/A/B = 10/80/10 |
| Example 10 | PET | IPA | 10 | Barium sulfate | 40/1.2 | | PET | IPA | 10 | Barium sulfate | 5.0/1.2 | | A:10, B80, C: 10 | A: 60, B: 35, C: 5 | B/A/B = 10/80/10 |
| Example 11 | PET | IPA | 12 | Barium sulfate | 35/1.2 | | — | — | — | — | — | | A: 70, D: 25, C: 5 | A: 60, B: 35, C: 5 | A = 100 |
| Comparative Example 1 | PET | NDC | 10 | Titanium dioxide | 30/0.05 | | PET | NDC | 10 | Titanium dioxide | 7.5/0.05 | | A: 60, B: 30, C: 10 | A: 60, B: 30, C: 10 | B/A/B = 15/70/15 |
| Comparative Example 2 | PET | IPA | 12 | Barium sulfate | 10/1.2 | | PET | IPA | 12 | Barium sulfate | 3.0/1.5 | | A: 50, B: 40, C: 10 | A: 50, B: 40, C: 10 | B/A/B = 15/70/15 |
| Comparative Example 3 | PET | NDC | 10 | Titanium dioxide | 30/1.5 | | PET | NDC | 10 | Titanium dioxide | 7.5/1.5 | | A: 60, B: 30, C: 10 | A: 60, D: 30, C: 10 | B/A/B = 15/70/15 |
| Comparative Example 4 | PET | NDC | 10 | Titanium dioxide | 30/1.5 | | PET | NDC | 10 | Titanium dioxide | 7.5/1.5 | | — | — | B/A/B = 15/70/15 |
| Comparative Example 5 | PET | IPA | 0.5 | Barium sulfate | 45/1.2 | | PET | IPA | 0.5 | Barium sulfate | 3.0/1.5 | | — | A: 60, B: 30, C: 10 | B/A/B = 12/76/12 |

TABLE 1-continued

| | A-layer film | | | | | | B-layer film | | | | | | Composition of coating solution | | Constituent ratio of layer |
|---|---|---|---|---|---|---|---|---|---|---|---|---|---|---|---|
| | Copolyester | | | Inorganic fine particle | | | Copolyester | | | Inorganic fine particle | | | A-surface | B-surface | |
| | Main skeleton | Copolymer component Component | mol % | Material | Additive amount/Average particle size % by weight/µM | | Main skeleton | Copolymer component Component | mol % | Material | Additive amount/Average particle size % by weight/µM | | % by weight | % by weight | |
| Comparative Example 6 | PET | IPA | 10 | Barium sulfate | 40/1.2 | | PET | IPA | 10 | Barium sulfate | 5.0/1.2 | | A: 65, B: 5, C: 30 | A: 68, D: 2, C: 30 | B/A/B = 10/80/10 |
| Comparative Example 7 | PET | CHDM | 8 | Calcium carbonate | 50/1.2 | | PET | CHDM | 8 | Calcium carbonate | 5.0/1.2 | | A: 60, B: 30, C: 10 | A: 70, D: 20, C: 10 | B/A/B = 20/60/20 |
| Comparative Example 8 | PET | IPA | 12 | Barium sulfate | 50/1.5 | | PET | IPA | 12 | Barium sulfate | 0.5/1.5 | | A: 60, B: 35, C: 5 | — | A/B = 70/30 |
| Comparative Example 9 | PET | IPA | 12 | Barium sulfate | 35/1.2 | | PET | IPA | 12 | Barium sulfate | 7.5/1.5 | | — | — | A/B = 70/30 |

PET: polyethylene terephthalate,
NDC: naphthalenedicarboxylate,
IPA: isophthalic acid,
CHDM: cyclohexane dimethanol
An A-layer side is taken as an A-surface in the case of two-layer constitution

TABLE 2

| | Thickness of biaxially stretched film (μm) | Stability of film forming | Adhesion property of coat | | Reflectivity | | Gloss level | | Difference in gloss level between front surface and rear surface | Surface resistivity | | Dust adhesion | |
|---|---|---|---|---|---|---|---|---|---|---|---|---|---|
| | | | A-surface | B-surface | A-surface | B-surface | A-surface | B-surface | | A-surface Ω/□ | B-surface Ω/□ | A-surface | B-surface |
| Example 1 | 130 | ○ | ○ | — | 100 | 93 | 18 | 80 | 62 | $8 \times 10^9$ | $7 \times 10^{15}$ | ○ | × |
| Example 2 | 150 | ○ | — | ○ | 94 | 99 | 81 | 19 | 62 | $6 \times 10^{15}$ | $7 \times 10^9$ | × | ○ |
| Example 3 | 150 | ○ | ○ | — | 99 | 96 | 51 | 79 | 28 | $5 \times 10^8$ | $7 \times 10^{15}$ | ○ | × |
| Example 4 | 150 | ○ | ○ | ○ | 96 | 99 | 82 | 49 | 33 | $8 \times 10^{15}$ | $7 \times 10^8$ | × | ○ |
| Example 5 | 100 | ○ | ○ | ○ | 97 | 92 | 17 | 52 | 35 | $1 \times 10^{10}$ | $9 \times 10^8$ | △ | △ |
| Example 6 | 100 | ○ | ○ | ○ | 93 | 98 | 51 | 18 | 33 | $8 \times 10^8$ | $1 \times 10^{10}$ | ○ | △ |
| Example 7 | 150 | ○ | ○ | ○ | 99 | 100 | 30 | 18 | 12 | $8 \times 10^9$ | $9 \times 10^9$ | ○ | ○ |
| Example 8 | 150 | ○ | ○ | ○ | 97 | 100 | 65 | 50 | 15 | $6 \times 10^8$ | $7 \times 10^8$ | ○ | ○ |
| Example 9 | 150 | ○ | × | × | 101 | 98 | 12 | 49 | 37 | $5 \times 10^{11}$ | $8 \times 10^8$ | △ | ○ |
| Example 10 | 150 | ○ | × | ○ | 101 | 99 | 11 | 55 | 44 | $7 \times 10^9$ | $5 \times 10^8$ | ○ | ○ |
| Example 11 | 100 | ○ | ○ | ○ | 96 | 97 | 14 | 31 | 17 | $5 \times 10^8$ | $6 \times 10^9$ | ○ | ○ |
| Comparative Example 1 | 150 | ○ | ○ | ○ | 85 | 84 | 18 | 19 | 1 | $7 \times 10^9$ | $8 \times 10^9$ | ○ | ○ |
| Comparative Example 2 | 150 | ○ | ○ | ○ | 84 | 83 | 17 | 18 | 1 | $6 \times 10^9$ | $7 \times 10^9$ | ○ | ○ |
| Comparative Example 3 | 20 | ○ | ○ | ○ | 65 | 58 | 17 | 55 | 38 | $8 \times 10^9$ | $5 \times 10^8$ | ○ | ○ |
| Comparative Example 4 | — | × | — | — | — | — | — | — | — | — | — | — | — |
| Comparative Example 5 | — | × | — | — | — | — | — | — | — | — | — | — | — |
| Comparative Example 6 | 150 | ○ | × | × | 102 | 100 | 10 | 45 | 35 | $5 \times 10^{13}$ | $2 \times 10^{13}$ | × | × |
| Comparative Example 7 | 270 | × | — | — | — | — | — | — | — | — | — | — | — |
| Comparative Example 8 | 170 | ○ | ○ | — | 101 | 96 | 12 | 93 | 81 | $7 \times 10^9$ | $8 \times 10^{15}$ | ○ | × |
| Comparative Example 9 | 100 | ○ | ○ | — | 96 | 94 | 16 | 81 | 65 | $7 \times 10^{15}$ | $8 \times 10^{15}$ | × | × |

An A-layer side is taken as an A-surface in the case of two-layer constitution

Example 11

A film was prepared by the same procedure as in Examples 1 to 10 except for changing the layer constitution to a single layer constitution (i.e., a resin was extruded by one extruder) and being conditions described in Tables 1 and 2. The antistatic property was also good.

Comparative Example 1

A film was prepared under the conditions shown in Tables 1 and 2. There was not a difference in a gloss level between the front surface and the rear surface since the antistatic agent B was used for both surfaces. The reflectivity was low since the average particle size of the inorganic fine particles was small.

Comparative Example 2

A film was prepared under the conditions shown in Tables 1 and 2. The content of the inorganic fine particle was low and the reflectivity was low. Further, there was not a difference in a gloss level between the front surface and the rear surface since the antistatic agent B was used for both surfaces.

Comparative Example 3

A film was prepared under the conditions shown in Tables 1 and 2. The thickness of the film was insufficient and the reflectivity was low.

Comparative Example 4

A film was prepared under the conditions shown in Tables 1 and 2. Since the inorganic fine particles were added in excess, a stretching property was extremely low and a film sample could not be prepared due to the frequent occurrence of break in forming a film.

Comparative Example 5

A film was prepared under the conditions shown in Tables 1 and 2. Since a copolymerized proportion was low and the barium sulfate particles were added in excess, a stretching property was reduced and a film sample could not be prepared due to the frequent occurrence of break in forming a film.

Comparative Example 6

A film was prepared under the conditions shown in Tables 1 and 2. The adhesion property to the polyester film of the coat was low due to the excessive addition of the surfactant. Further, the surface resistivity became a high value due to the lack of the antistatic agent B consisted of a polycation polymer or the conductive polymer D and therefore the adhesion of dust could not be prevented.

Comparative Example 7

A film was prepared under the conditions shown in Tables 1 and 2. Since the film was thickened in excess, a stretching property was extremely low and a film sample could not be prepared due to the frequent occurrence of break in forming a film.

Comparative Example 8

A film was prepared under the conditions shown in Tables 1 and 2. Though the two-layer constitution of layer A/layer B was formed, a difference in a gloss level between the front surface and the rear surface became a value more than 80 since the amount of the inorganic fine particles added to the B-layer was small and further the antistatic coat was not applied to the B-surface.

Comparative Example 9

A film was prepared under the conditions shown in Tables 1 and 2. Since the two-layer constitution of layer A/layer B was formed, there was a difference in a gloss level between the front surface and the rear surface, but since the antistatic coat was not applied, the surface resistivity became a high value and the adhesion of dust could not be prevented.

Industrial Applicability

The polyester film of the present invention has a high reflectivity of light and resists the adhesion of dirt and dust, and the gloss levels of both surfaces of the film are controlled and therefore this film can be most suitably used for various reflectors, among others, a reflector of a liquid crystal display or a back sheet of a solar cell.

The invention claimed is:

1. An antistatic white polyester film for a surface illuminant reflector, having a thickness of 25 µm to 250 µm, a base material layer formed by using a polyester resin and an applied antistatic layer having a surface resistivity of $3\times10^{12}$ Ω/sq or less at a temperature of 23° C. and at a relative humidity of 50%, wherein
    an average reflectivity at a wavelength of 400 to 700 nm is 90% or more and a gloss level at 60° is 20 or less on the surface of the antistatic layer;
    a difference in gloss level at 60° between one surface and the other surface of the polyester film is 5 to 80;
    the base material layer comprises a layer A and a layer B in a three-layer constitution of layer B/layer A/layer B;
    the layer A is a polyester composition layer including barium sulfate particles having an average particle size of 0.1 to 10 µm in an amount of 21 to 60% by weight relative to that of the layer A and/or rutile-type titanium dioxide particles having an average particle size of 0.1 to 5.0 µm in an amount of 1 to 40% by weight relative to that of the layer A;
    the layer B is a polyester composition layer including barium sulfate particles having an average particle size of 0.1 to 10 µm in an amount of 0.1 to 15% by weight relative to that of the layer B and/or rutile-type titanium dioxide particles having an average particle size of 0.1 to 5.0 µm in an amount of 1 to 15% by weight relative to that of the layer B; and
    the layer A contains more inorganic particles than layer B.

2. The antistatic white polyester film for a surface illuminant reflector according to claim 1, wherein the polyester used in the layer A is a polyethylene terephthalate-based polyester including a copolymerized component in an amount of 1 to 15 mole percent relative to that of total dicarboxylic acid components.

3. The antistatic white polyester film for a surface illuminant reflector according to claim 2, wherein said applied antistatic layer is a layer formed by using a composition containing 25 to 80% by weight of at least one binder resin (A) selected from the group consisting of a polyester resin and an acrylic resin, 10 to 60% by weight of an antistatic agent (B) consisting of a polycation polymer, and 1 to 15% by weight of a surfactant (C), taking the sum of the compounds (A), (B) and (C) as 100% by weight.

4. The antistatic white polyester film for a surface illuminant reflector according to claim 2, wherein the applied antistatic layer is a layer formed by using a composition including 45 to 80% by weight of at least one binder resin (A) selected from a polyester resin and an acrylic resin, 5 to 40% by weight of a conductive polymer (D), and 1 to 15% by weight of a surfactant (C), taking the sum of the compounds (A), (C) and (D) as 100% by weight.

5. The antistatic white polyester film for a surface illuminant reflector according to claim 1, wherein said applied antistatic layer is a layer formed by using a composition containing 25 to 80% by weight of at least one binder resin (A) selected from the group consisting of a polyester resin and an acrylic resin, 10 to 60% by weight of an antistatic agent (B) consisting of a polycation polymer, and 1 to 15% by weight of a surfactant (C), taking the sum of the compounds (A), (B) and (C) as 100% by weight.

6. The antistatic white polyester film for a surface illuminant reflector according to claim 1, wherein the applied antistatic layer is a layer formed by using a composition including 45 to 80% by weight of at least one binder resin (A) selected from a polyester resin and an acrylic resin, 5 to 40% by weight of a conductive polymer (D), and 1 to 15% by weight of a surfactant (C), taking the sum of the compounds (A), (C) and (D) as 100% by weight.

7. The antistatic white polyester film for a surface illuminant reflector according to claim 1, which is used for a reflector of a flat-panel display.

8. The antistatic white polyester film for a surface illuminant reflector according to claim 1, wherein the average reflectivity at a wavelength of 400 to 700 nm is 94% or more on one surface of the polyester film;
  the difference in gloss level at 60° between one surface and the other surface of the polyester film is 10 to 70, and the gloss level at 60° of at least one surface is 18 or less.

* * * * *